(12) United States Patent
Oyedeji et al.

(10) Patent No.: US 12,535,120 B2
(45) Date of Patent: Jan. 27, 2026

(54) AXIAL DAMPING DEVICE WITH ELASTOMERS

(71) Applicant: UNIVERSITA' DEGLI STUDI DI MODENA E REGGIO EMILIA, Modena (IT)

(72) Inventors: Federico Oyedeji, Modena (IT); Matteo Pelliciari, Modena (IT); Luca Lanzoni, Modena (IT); Angelo Marcello Tarantino, Modena (IT); Enrico Salardi, Modena (IT)

(73) Assignee: UNIVERSITA' DEGLI STUDI DI MODENA E REGGIO EMILIA, Modena (IT)

( * ) Notice: Subject to any disclaimer, the term of this patent is extended or adjusted under 35 U.S.C. 154(b) by 384 days.

(21) Appl. No.: 18/036,340

(22) PCT Filed: Nov. 4, 2021

(86) PCT No.: PCT/IT2021/050361
§ 371 (c)(1),
(2) Date: May 10, 2023

(87) PCT Pub. No.: WO2022/101946
PCT Pub. Date: May 19, 2022

(65) Prior Publication Data
US 2024/0052909 A1 Feb. 15, 2024

(30) Foreign Application Priority Data
Nov. 11, 2020 (IT) .......................... 102020000027029

(51) Int. Cl.
*F16F 15/08* (2006.01)

(52) U.S. Cl.
CPC ........ *F16F 15/08* (2013.01); *F16F 2224/025* (2013.01)

(58) Field of Classification Search
CPC ....... F16F 15/08; F16F 15/02; F16F 2224/025
See application file for complete search history.

(56) References Cited

U.S. PATENT DOCUMENTS 5,669,594 A * 9/1997 Platus ..................... F16F 15/06
248/619
5,730,429 A * 3/1998 Ivers ....................... F16F 15/08
267/140.14

(Continued)

FOREIGN PATENT DOCUMENTS

| CN | 106368328 A | 2/2017 | |
|---|---|---|---|
| WO | 2010012049 A1 | 2/2010 | |
| WO | WO-2016034612 A1 * | 3/2016 | ............. F16F 15/08 |

*Primary Examiner* — Thomas W Irvin

(57) ABSTRACT

A device (5, 20) is described for isolating and damping uniaxial vibrations to be interposed between rigid elements (2, 3) in relative motion, comprising damping and insulating means (15) in elastomeric material, suitable for performing this function of insulation and damping through repeated deformations and consequent hysteresis of the elastomeric material; the device (5, 20) comprises: a first head (11); at least two sleeves (11a) integral with the first head (11); a second head (12); at least two bars (13) which are inserted at a first end in the sleeves (11a) and are connected at a second end with the second head (12); at least one stabilizing jacket (14); and an elastic element (15) which is interposed between the first head (11) and the second head (12), reacting to compression when, due to the application of the load, the damper device (5, 20) is shortened.

9 Claims, 5 Drawing Sheets

(56) References Cited

U.S. PATENT DOCUMENTS

| | | | |
|---|---|---|---|
| 9,234,561 B2 * | 1/2016 | Laurens | B64G 1/38 |
| 2024/0401361 A1 * | 12/2024 | Salvatore | F16F 15/04 |

* cited by examiner

AXIAL DAMPING DEVICE WITH ELASTOMERS

RELATED APPLICATIONS

This application is the national stage under 35 U.S.C. 371 of International Application No. PCT/IT2021/050361, filed Nov. 4, 2021; which claims priority to Italian Application No. 102020000027029, filed Nov. 11, 2020; the entire contents of each of which are incorporated by reference herein.

FIELD OF THE INVENTION

The present invention refers to a device suitable for isolating and damping uniaxial vibrations.

BACKGROUND OF THE INVENTION

Damping devices are known, suitable for damping uniaxial vibrations.

For example, in case of vehicle suspensions, the suspensions themselves guide the movements of the wheels, with respect to the bodywork, in such a way that the trajectory of the wheels is substantially straight. In these cases the suspension is usually obtained by means of steel spring elements and the damping is obtained by means of gas or oil shock absorbers.

In case of bicycles, especially mountain bikes, the front fork is often cushioned. Also in this case steel springs and damping by oil or gas are used.

A particular type of damping is obtained through the use of elastomers, which simultaneously perform the function of springing and damping.

According to the known art, the dissipation of vibrations and the consequent insulation are obtained by means of hysteresis cycles of blocks made of elastomeric material.

It is known that elastomers, subjected to uniaxial hysteresis loops, exhibit a unique behavior known as the Mullin Effect. This effect is induced by the micro-structure typical of polymeric materials which, subject to loading and unloading cycles, tend to align their monomers, exhibiting an increase in the hardening and dissipative capacity of the material.

These prior art dissipators have a drawback when it is desired to obtain a high stroke. This result is not obtainable with known devices, since the elastomers are loaded by compression and, to avoid instability, the blocks are squat and, as such, not very deformable as a given percentage deformation corresponds to a limited displacement of the ends of the block itself.

Document CN-A-106 368 328 describes a device for isolating and damping uniaxial vibrations according to the preamble of claim 1.

SUMMARY OF THE INVENTION

Object of the present invention is providing a dissipating device capable of damping uniaxial vibrations having a high amplitude.

The aforementioned and other objects and advantages of the invention, which will emerge from the following description, are achieved with a device for isolating and damping uniaxial vibrations such as the one described in claim 1.

This device, which is interposed between rigid elements in relative motion, is of the type comprising damping and insulating means in elastomeric material and is able to perform the insulating and damping function through repeated deformations and consequent hysteresis of the elastomeric material, and comprises:
 a. a first head;
 b. at least two sleeves integral with the first head;
 c. a second head;
 d. at least two bars which are inserted with a first end in the sleeves and are connected with a second end with the second head;
 e. at least one stabilizing jacket, sliding on the bars;
 f. an elastic element of prismatic shape which is interposed between the first head and second head, reacting to compression when, due to the application of the load, the damper device is shortened, in which the at least one stabilizing jacket has the function of preventing a side skidding of the elastic element of prismatic shape.

According to a preferred embodiment, the damping device is a connecting rod connected to the rigid elements by means of spherical hinges applied to the ends of the connecting rod.

In the device according to the invention, the dissipating element is a neoprene prism, subject to hysteresis cycles under compression. The device will preferably be mounted by applying a preload so that the dissipating element will always be compressed. At the end of its life cycle, the dissipating element can be replaced by simply opening the device.

The main advantages resulting from the use of the invention are the following.

A first advantage consists in increasing the useful life of the product since, at the end of the elastomer life cycle, the replacement of the entire device is not required, but only that of the elastomer.

A second advantage consists in adaptability and design: an appropriate choice of the geometric characteristics of the connecting rod and of the elastomeric prismatic element allows in fact to cover a wide range of stiffness (0.01÷10 kN/mm).

A third advantage consists in the possibility of fully exploiting the axial deformation regime, which is more efficient than a cutting or bending regime; this allows, with the same volumes and dimensions, to reduce the quantity of the most expensive material, namely neoprene. Thinking of a commercial product in neoprene with horizontal and vertical stiffness, respectively, $K_o=7$ kN/mm and $K_v=5000$ kN/mm, the analogue product according to the invention maintains the same volume and the same weight but allows reducing by an order of magnitude the amount of elastomeric material to the detriment of the increase in steel (the first four times more expensive than the second).

Preferred embodiments and non-trivial variations of the present invention form the subject matter of the dependent claims.

It is understood that all attached claims form an integral part of the present description.

It will be immediately obvious that innumerable variations and modifications (for example relating to shape, dimensions, arrangements and parts with equivalent functionality) can be made to what is described without departing from the scope of the invention, as appears from the attached claims.

BRIEF DESCRIPTION OF THE DRAWINGS

The present invention will be better described by some preferred embodiments, provided by way of non-limiting example. The description will refer to a damper device that makes use of the connecting rod according to the invention, the device being illustrated in the attached drawings, in which:
a.

DETAILED DESCRIPTION OF PREFERRED EMBODIMENTS

Figure 1:
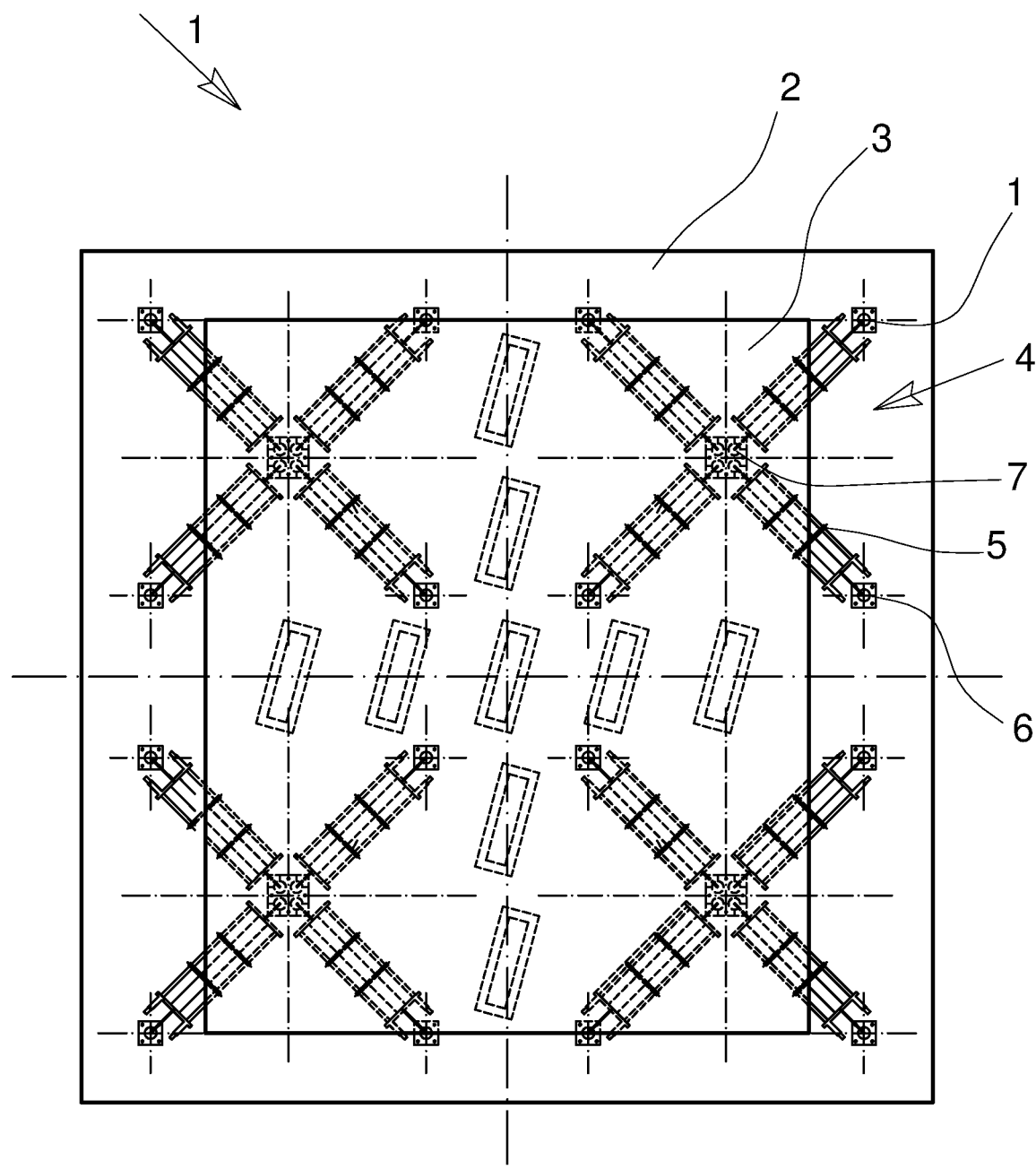
FIGS. 1 and 2 are two views of a damper device which makes use of the connecting rods according to the present invention;
b.
Figure 2:
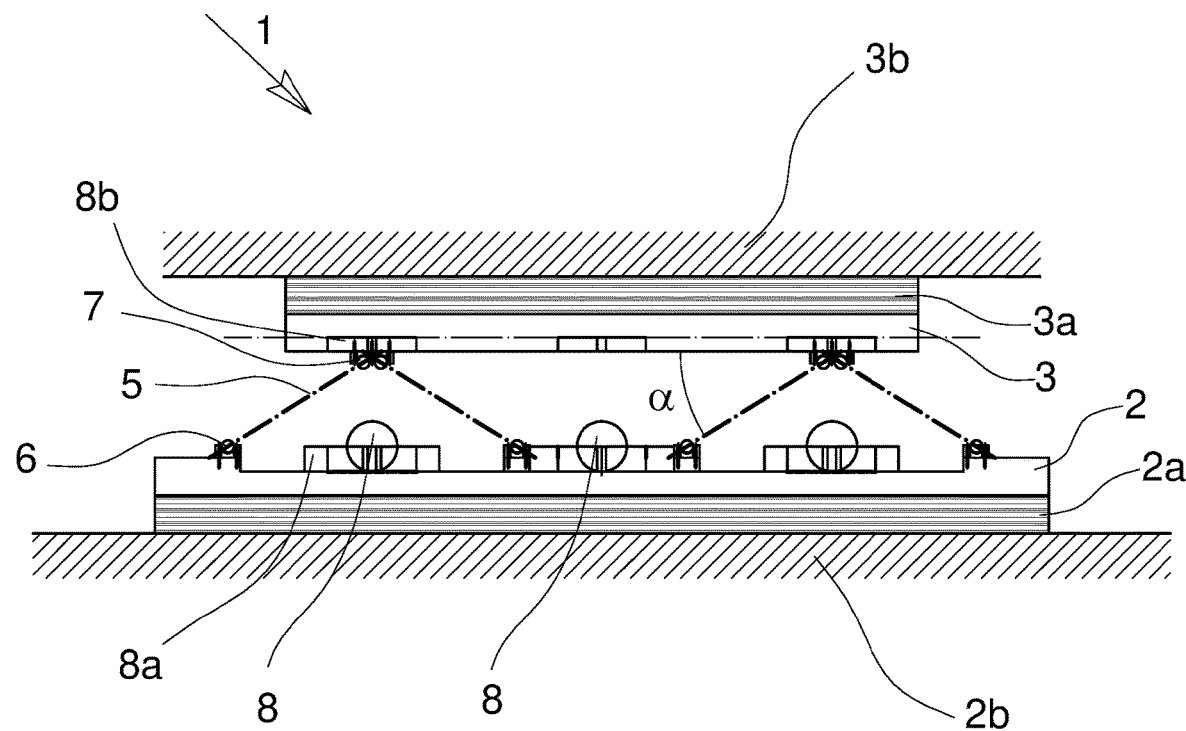
Figure 3:
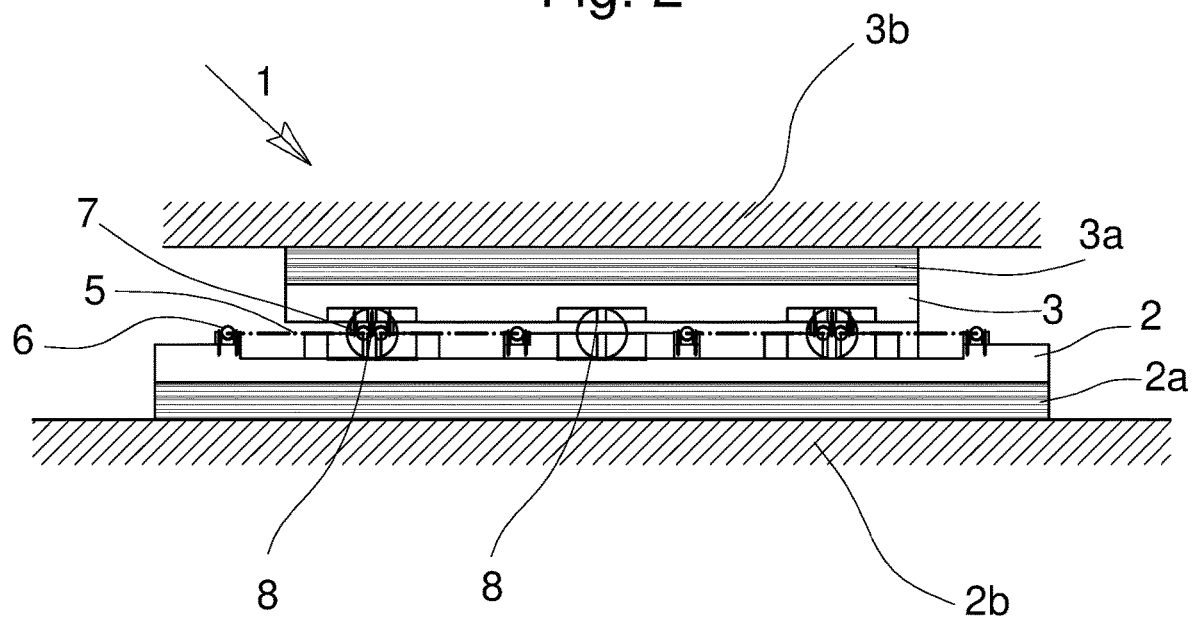
FIG. 3 shows the damper device under the effect of an applied vertical load;
c.

Referring to FIGS. 1, 2 and 3, (1) designates a damper device which makes use of connecting rods (5) according to the present invention.

According to a preferred embodiment of the invention, the device (1) comprises:
a. a lower plate (2) which, with the interposition of a sheet of elastomeric material (2a) rests on a support (2b);
b. an upper plate (3) which, with the interposition of a sheet of elastomeric material (3a) acts as a support to a mass (3b);
c. at least three trusses (4), each consisting of at least the three connecting rods (5), axially deformable, each of which is connected at its lower end (5a) with the lower plate (2) by means of first spherical hinges (6) and at its upper end (5b), with the upper plate (3), by means of second spherical hinges (7).

According to a preferred embodiment, illustrated in the attached figures, the trusses (4) are four in number for each damper, and each of the truss (4) comprises four connecting rods (5). In FIG. 2, the connecting rods (5) are indicated through their axis, so as not to excessively complicate the drawing.

Furthermore, there is preferably a plurality of spacing balls or linear guides (8), housed in corresponding seats (8a), the function of which will be described below.

According to a preferred embodiment, shown in the attached figures, the trusses are four in number for each damping device (1) and the connecting rods (5) are four in number for each truss (4).

The connecting rods (5) of the trusses (4) are arranged along the edges of a pyramid with the base resting on the lower plate (2).

When the mass to be supported is not resting on the damper device (1), the connecting rods (5) are inclined with respect to the plates (2, 3) by an angle α between 0° and 60°. When the load is applied, that is when the supported mass (3a) is placed on the upper plate (3), the connecting rods (5), due to the inclination, are subjected to compression and, being axially deformable, get shortened, allowing the upper plate (3), and then the supported mass (3a) to descend, until the spacing balls (8) rest against the upper plate (3) (FIG. 3).

The spacer balls or linear guides (8) are of such dimensions that, following the lowering of the upper plate (3), the connecting rods (5) are placed in a position substantially parallel to the plates (2) and (3). In this way, reciprocal sliding between the plates (2) and (3) gives rise to variations in length of the connecting rods (5), thus excluding shear stresses in the elastomeric elements.

Figure 4:
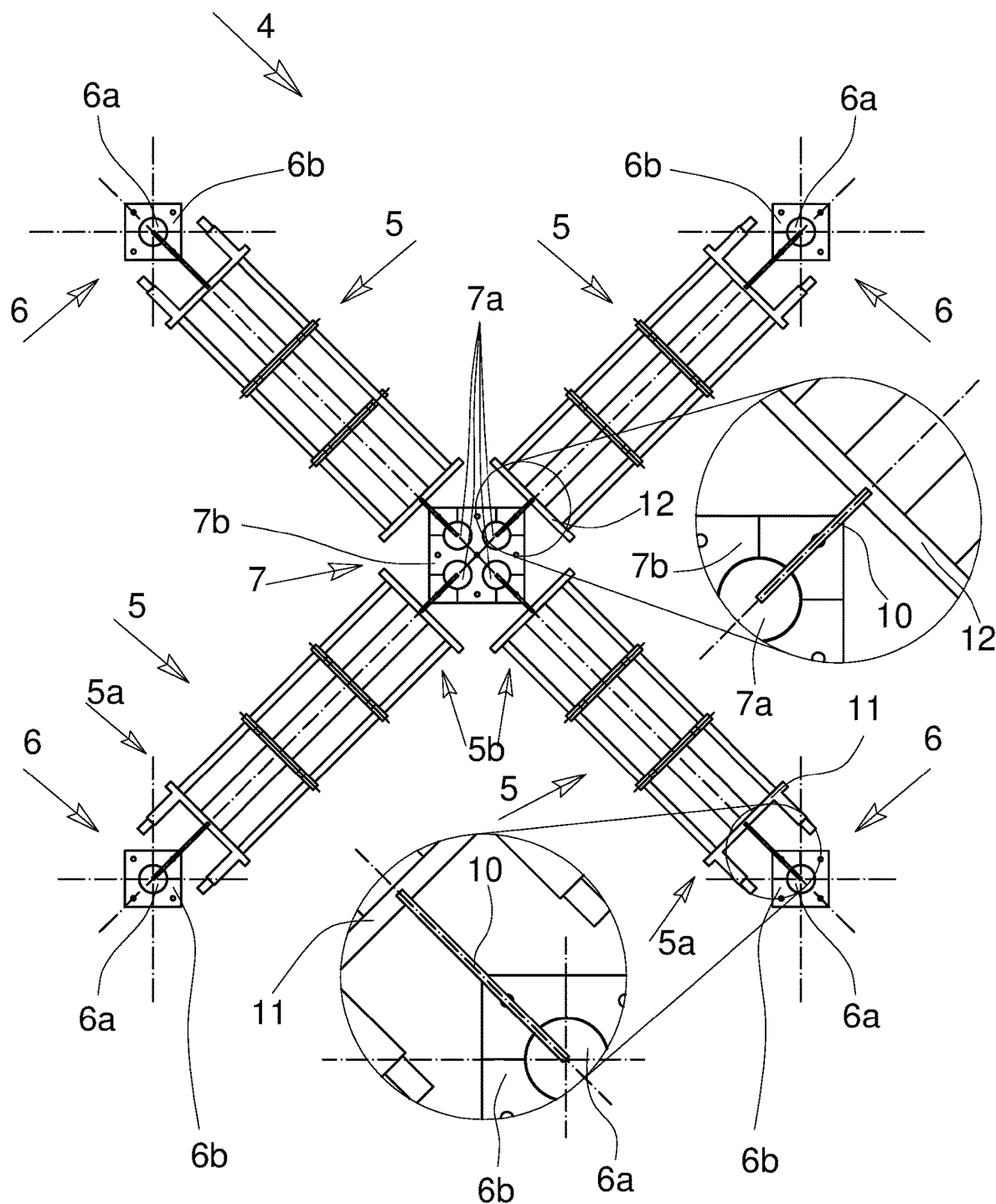
FIG. 4 shows the basic structure of the device according to the invention;
d.

FIG. 4 shows one of the trusses (4). According to a preferred embodiment, the lower spherical hinges (6) comprise a steel ball (6a) housed in a seat (6b) connected to the lower plate (2), while the upper spherical hinges (7) comprise a ball in steel (7a) housed in a seat (7b) connected to the upper plate (3).

The connecting rods (5) are, in turn, connected with the lower (6) and upper (7) spherical hinges by means of threaded pins (10) which are screwed to the balls (6a) and (7a) and to a first and a second head (11) and (12) of the connecting rods (5), as shown in the enlarged details of FIG. 4.

Figure 5:
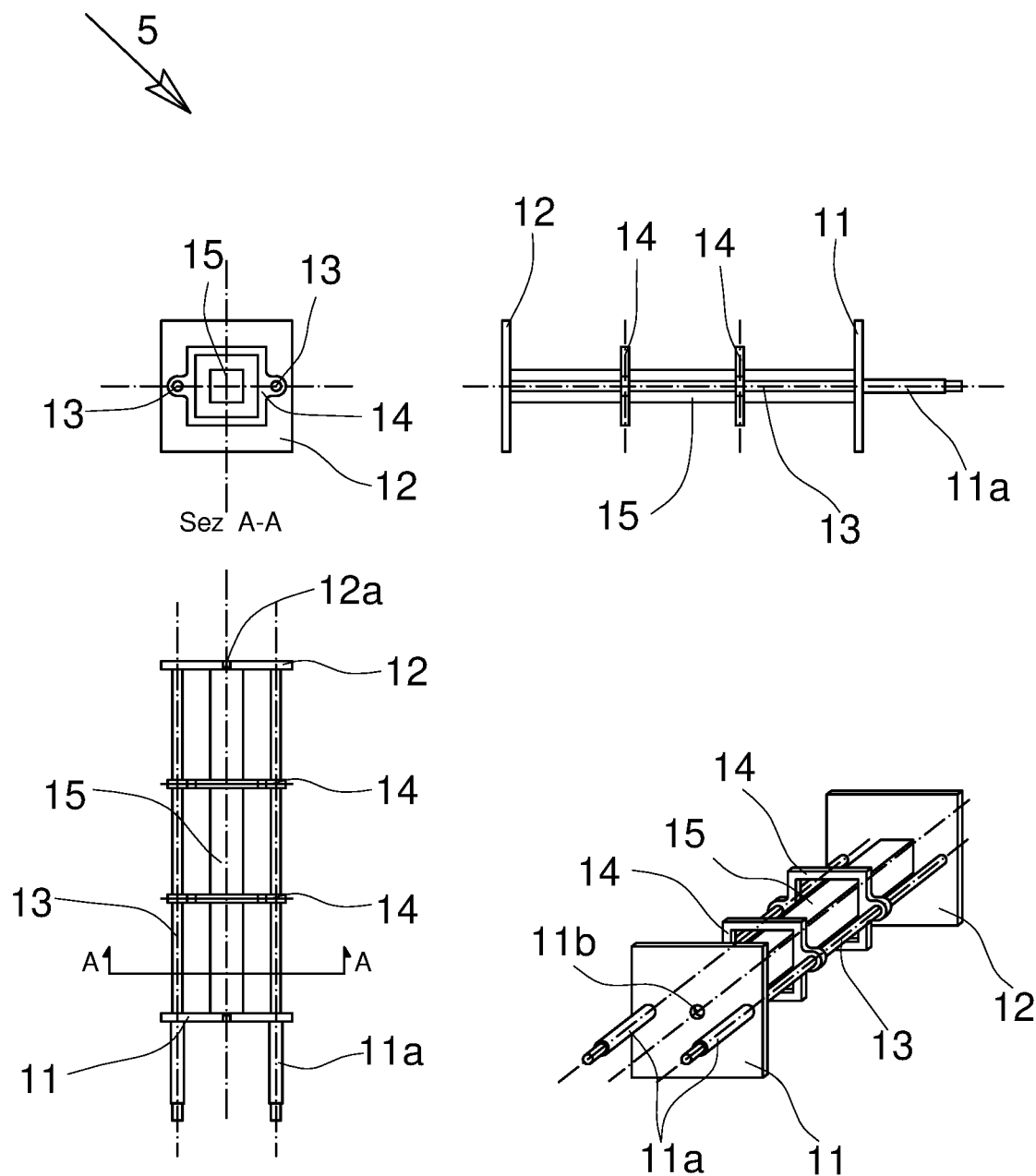
FIGS. 5 and 6 show two possible embodiments of the connecting rod according to the invention.

FIG. 5 shows a first embodiment of the connecting rod (5). The connecting rod (5) includes:
a. the first head (11);
b. at least two sleeves (11a) integral with the first head (11);
c. the second head (12);
d. at least two bars (13) which are inserted with a first end in the sleeves (11a) and are connected with a second end with the second head (12);
e. at least one stabilizing jacket (14), sliding on the bars (13);
f. an elastomeric element with a prismatic shape (15).

Two threaded holes are made on the heads (11) and (12), respectively (11b) and (12a), in which the threaded pins (10) are screwed, which have the function of connecting with the spherical hinges (6) and (7).

The prismatic elastomeric element (15) connects the two heads (11) and (12) together and reacts by shortening to the compressive stresses resulting from the shortening due to the application of the load.

When the compression load is applied, due to the high slenderness of the elastomeric component (13), it tends to skid laterally. This drawback is eliminated by the anti-skid pads (14), sliding on the bars (13), which surround the prismatic elastomeric element (15) and prevent lateral skidding thereof. The number of anti-skid pads (14) is calculated in such a way as to reduce the free deflection length of the elastomeric prism below the critical values.

Figure 6:
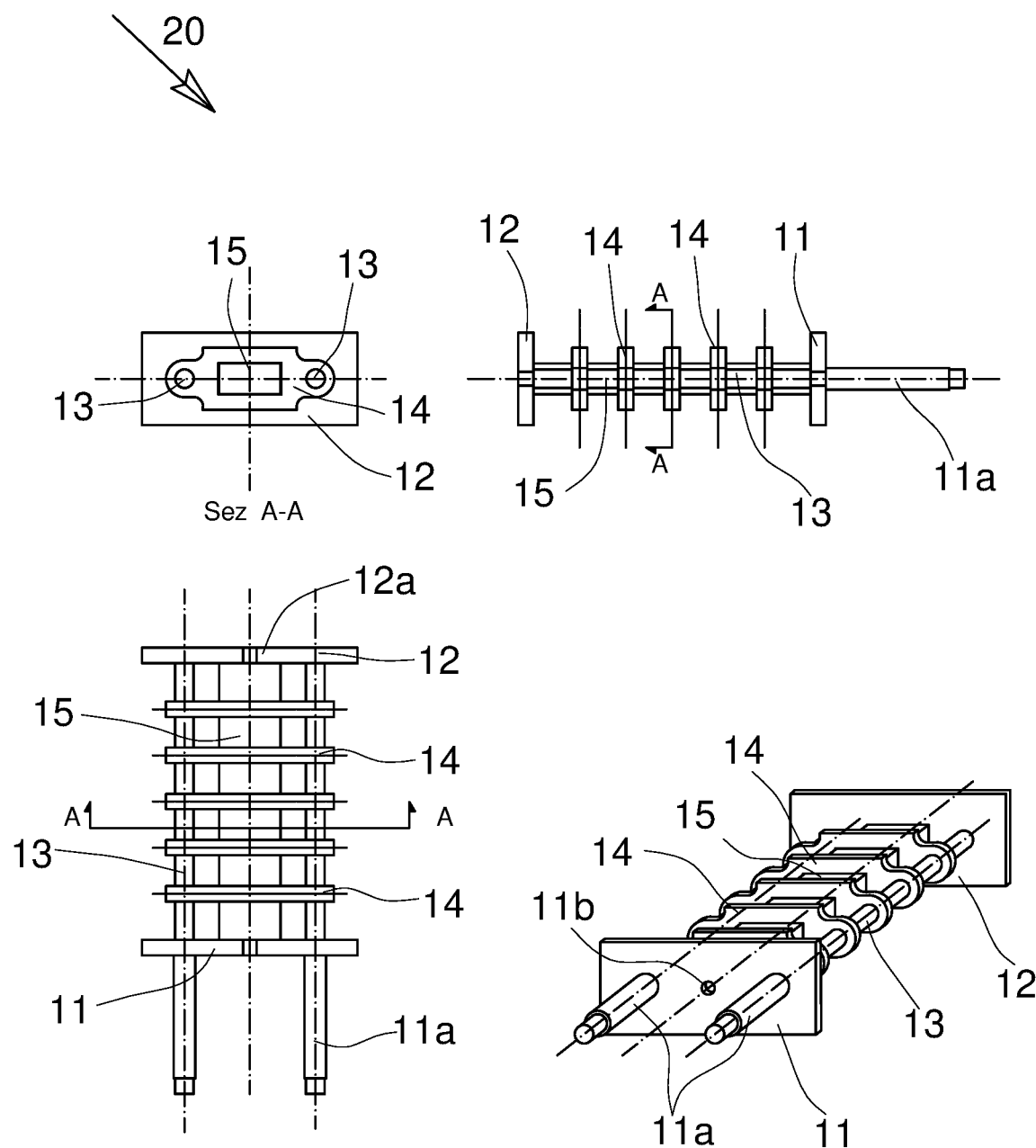

FIG. 6 shows a connecting rod (20), conceptually similar to the connecting rod (5), as it is made up of the same components. The connecting rod (20) is less slender than the connecting rod (5), so as to give the device (1) greater horizontal stiffness. The number of anti-skid pads of the connecting rod (5) and connecting rod (20) depends on the horizontal load levels provided on the insulator.

According to a preferred embodiment (not shown), the connecting rods (5, 20) are already mounted in the position they would have after applying the load. Obviously it is advisable to carry out the assembly by applying an appropriate preload, so that the stress is always compressive, in any case of calculation and load of the insulator.

The invention claimed is:
1. A device (5, 20) for isolating and damping uniaxial vibrations by being interposed between rigid elements (2, 3) in relative motion, comprising damping and insulating means (15) in elastomeric material, suitable for performing an insulation and damping function through repeated deformations and consequent hysteresis of the elastomeric material, comprising:
a first head (11);
at least two sleeves (IIa) integral with the first head (11);
a second head (12);
at least two bars (13) which are inserted at a first end in the sleeves (IIa) and are connected at a second end with the second head (12);
at least one stabilizing jacket (14);

an elastic element (15) which is interposed between the first head (11) and second head (12), reacting to compression when, due to the application of the load, the damper device (5, 20) is shortened; characterized in that:

the at least one stabilizing jacket (14), slides on the bars (13); the elastic element (15) is prismatic m shape.

2. The device (5, 20) for isolating and damping uniaxial vibrations according to claim 1, characterized in that the device is a connecting rod (5, 20) connected to the rigid elements (2, 3) by means of spherical hinges (6, 7) applied to the ends of the connecting rod (5, 20).

3. The device (5, 20) for isolating and damping uniaxial vibrations according to claim 2, characterized in that the connecting rods (5, 20) are connected with the spherical hinges (6, 7) by means of a pin (10) which screws on the heads (11, 12) and on the balls (6a, 7a) of the spherical hinges (6, 7).

4. The device (5, 20) for isolating and damping uniaxial vibrations according to claim 3, characterized in that the connecting rods (5, 20) are mounted in the working position by applying a suitable preload, so that stress on the elastomeric prismatic element (15) is always compression, in any working situation due to vibrations.

5. The device (5, 20) for isolating and damping uniaxial vibrations according to claim 3, characterized in that the prismatic element (15) is made of neoprene.

6. The device (5, 20) for isolating and damping uniaxial vibrations according to claim 2, characterized in that the connecting rods (5, 20) are mounted in the working position by applying a suitable preload, so that stress on the elastomeric prismatic element (15) is always compression, in any working situation due to vibrations.

7. The device (5, 20) for isolating and damping uniaxial vibrations according to claim 2, characterized in that the prismatic element (15) is made of neoprene.

8. The device (5, 20) for isolating and damping uniaxial vibrations according to claim 1, characterized in that the connecting rods (5, 20) are mounted in a working position by applying a suitable preload, so that stress on the elastomeric prismatic element (15) is always compression, in any working situation due to vibrations.

9. The device (5, 20) for isolating and damping uniaxial vibrations according to claim 1, characterized in that the prismatic element (15) is made of neoprene.

\* \* \* \* \*